Oct. 25, 1949.      D. JOURNEAUX      2,486,165
WELDING TRANSFORMER CONTROL SYSTEM
Filed April 24, 1946
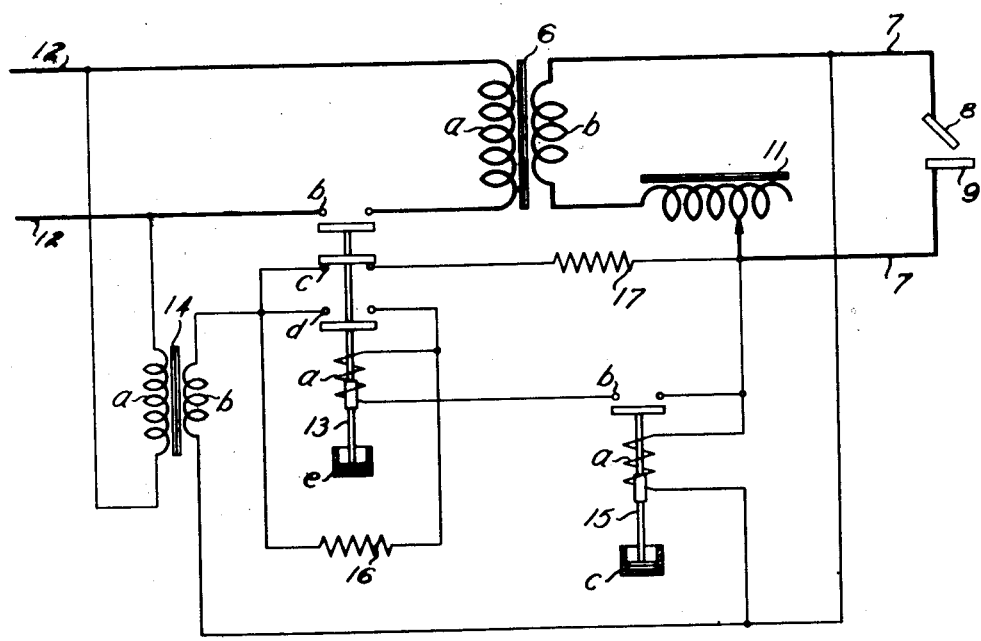
INVENTOR
Didier Journeaux

UNITED STATES PATENT OFFICE 2,486,165

WELDING TRANSFORMER CONTROL SYSTEM

Didier Journeaux, Wauwatosa, Wis., assignor to Allis-Chalmers Manufacturing Company, Milwaukee, Wis., a corporation of Delaware Application April 24, 1946, Serial No. 664,567

4 Claims. (Cl. 323—57)

This invention relates in general to improvements in control systems for welding transformers, and more particularly to means for automatically rendering a welding transformer inoperative when the associated welding circuit becomes short circuited or open circuited.

The supply of alternating current to welding electrodes is frequently effected through a transformer having a secondary open circuit voltage of sufficient magnitude to subject an operator touching both electrodes simultaneously to shock or to greater hazards. The transformer may also be seriously damaged if the secondary winding thereof remains short circuited for a considerable length of time. It is therefore desirable to render the transformer inoperative whenever the associated welding circuit is idle or short circuited. The means provided to perform the latter function may comprise different arrangements of switching devices, such as contactors and relays, which are provided with operating coils. To insure that the welding transformer does not accidentally become reconnected for normal operation in response to burning out of an actuating coil, it is advantageous to so design the system that such operative connection requires all actuating coils to be supplied with current.

In a preferred embodiment of the invention, the actual voltage of the welding circuit is compared with a voltage equal to the secondary open circuit voltage of the welding transformer through connections comprising an inductive voltage divider for detecting the actual condition of the welding circuit. To reduce the cost and complication of the system to the greatest possible extent, the coil controlling the closing operation of the contactor switch for the welding transformer and the coil of a relay for causing opening of the contactor switch upon short circuiting of the welding circuit may form the principal elements of the voltage divider.

It is therefore an object of the present invention to provide an improved system for rendering a welding transformer inoperative when the associated welding circuit is idle or open circuited, in which burning out of the actuating coil of any switching device will prevent operative connection of the transformer.

Another object of the present invention is to provide an improved system for rendering a welding transformer inoperative when the associated welding circuit is idle or short circuited, in which the desired operation is obtained by the use of only two switching devices.

Objects and advantages other than those above set forth will be apparent from a consideration of the following description when read in connection with the accompanying drawing, which diagrammatically illustrates one embodiment of the present invention.

Referring more particularly to the drawing by characters of reference, numeral 6 designates a welding transformer provided with a primary winding 6a and a secondary winding 6b. The secondary winding is connected with a welding circuit 7 for supplying current to a pair of electrodes 8, 9. Electrode 8 is assumed to be a rod of weld metal, and electrode 9 the work to be welded. The flow of current through electrodes 8, 9 is adjustably limited by causing the path of the current flowing through winding 6a or through winding 6b to have a substantial impedance. The latter result may be obtained by so disposing windings 6a, 6b as to cause the leakage reactance thereof to have a substantial value or by connecting winding 6b to circuit 7 through impedance means such as an adjustable reactor 11 of any suitable type.

Winding 6a is to be connected with a suitable source of current such as a circuit 12 energized from a suitable generator (not shown) through connections including the main contacts 13b of a contactor switch 13. Closing operation of switch 13 is controlled by means of an inductive actuating coil 13a which preferably actuates the armature of switch 13 directly, although such actuation may also be effected through the intermediary of a relay. Coil 13a is energized from an auxiliary transformer 14 provided with a primary winding 14a connected across circuit 12. The secondary winding 14b of transformer 14 is an undivided winding having an open circuit voltage substantially equal to the open circuit voltage of winding 6b. Means comprising coil 13a connect winding 14b across welding circuit 7 to cause closure of switch 13 in response to increase of the voltage impressed on coil 13a upon momentary short circuiting of circuit 7, and to cause opening of switch 13 in response to open circuiting of circuit 7. Switch 13 preferably operates instantaneously to close contacts 13b. The speed of opening of contacts 13b may however be adjusted to any desired extent by proper choice of the elements of switch 13, which may include any suitable known delaying means conventionally represented as a dashpot 13e.

A delayed relay 15 is provided for opening the circuit of coil 13a to cause opening of switch 13 in response to short circuiting of circuit 7. The actuating coil 15a of relay 15 may be inserted in either connection between coil 13a and the two conductors of circuit 7. In the present embodiment, coil 15a is connected between coil 13a and the conductor of circuit 7 connected to electrode 8, and coil 15a accordingly also forms part of a shunt circuit connected across circuit 7. Contacts 15b of relay 15 are inserted in one of the connections joining coil 13a with winding 14b and with circuit 7. Relay 15 may be provided with a dashpot 15c or other suitable means for causing contacts 15b to close instantaneously and to open with a predetermined time delay.

As a result of the connections above set forth, inductive coils 13a, 15a constitute elements of an inductive voltage divider connected across winding 14b, circuit 7 being connected across only a portion of the voltage divider consisting of coil 15a for causing selective energization of coil 13a in dependence upon the magnitude of the voltage of circuit 7. Coil 13a is so dimensioned as to cause switch 13 to remain in the position shown as long as circuit 7 is energized only from transformer 14 through coil 13a, and to cause switch 13 to close contacts 13b in response to momentary short circuiting of circuit 7. To allow greater latitude in the choice of coil 13a, a resistor 16 bridged by contacts 13d of switch 13 may be connected in series with coil 13a. The voltage divider further comprises a suitable impedance device, such as a resistor 17 connected in parallel with resistor 16, coil 13a, and contacts 15b for energizing circuit 7 and coil 15a prior to closure of contacts 15b. To reduce the amount of energy dissipated in the voltage divider, the connections thereof may be modified in response to operation of switch 13 opening contacts 13c connected in series with resistor 17.

In operation, circuit 12 being energized and switch 13 being in the position shown, winding 6a does not receive current from circuit 12. Winding 14a, however, is energized from circuit 12 and a voltage equal to substantially the normal open circuit voltage of winding 6b is impressed from winding 14b on contacts 13c, resistor 17 and circuit 7. A predetermined reduced voltage is thus impressed on circuit 7 and on coil 15a, and relay 15 closes contacts 15b to connect coil 13a and resistor 16 between circuit 7 and winding 14b. The flow of current through coil 13a causes the voltage impressed on circuit 7 to rise, but the elements of the system are so chosen that the voltage of circuit 7 does not reach such a value as to constitute a substantial hazard to human life. The voltage then impressed on coil 13a is insufficient to cause operation of switch 13.

Welding operation may be initiated by momentarily bringing electrode 8 in contact with electrode 9. Circuit 7 is thereby momentarily short circuited, and the full voltage of winding 14b is impressed on coil 13a and resistor 16. Switch 13 closes contacts 13b, which connect winding 6a with circuit 12, and opens contacts 13c to prevent further dissipation of energy in resistor 17.

Electrodes 8, 9 may then be separated to draw a welding arc therebetween. Circuit 7 is then mainly supplied with current from transformer 6, and the flow of current from winding 6b through reactor 11 maintains the voltage of circuit 7 within a limited range of values substantially lower than the open circuit voltage of winding 6b. Relay 15 maintains contacts 15b closed as long as the voltage of circuit 7 retains a substantial value. The voltage impressed on coil 13a through contacts 13d and 15b remains sufficiently high to cause switch 13 to maintain contacts 13b closed.

When the welding arc is interrupted by separation of electrodes 8, 9 beyond a predetermined distance, the flow of current through winding 6b and reactor 11 decreases to a negligible value. Winding 6b then impresses on circuit 7 substantially the full open circuit voltage thereof, which is equal to the voltage of winding 14b. The two terminals of coil 13a then being at substantially the same potential, the coil is without appreciable current and switch 13 opens contacts 13b to disconnect winding 6a from circuit 12. Circuit 7 is then again energized at reduced voltage from winding 14b, and another welding operation may be initiated by engagement of electrodes 8, 9.

If electrodes 8, 9 are held in contact for a substantial length of time, switch 13 first closes contacts 13b in the manner above set forth. After a predetermined length of time, relay 15 returns to the position shown, thereby opening contacts 15b and deenergizing coil 13a. Winding 6a is disconnected from circuit 12 and the welding electrodes are supplied with current of negligible value from winding 14b through resistor 17. Upon subsequent separation of electrodes 8, 9, relay 15 recloses contacts 15b to prepare the system for initiation of another welding operation.

Although but one embodiment of the present invention has been illustrated and described, it will be apparent to one skilled in the art that various changes and modifications may be made therein without departing from the spirit of the invention or from the scope of the appended claims.

It is claimed and desired to secure by Letters Patent:

1. In a control system for a welding transformer comprising a primary winding to be connected across a source of alternating current and a secondary winding connected to a welding circuit, the combination of a switch for connecting said primary winding with said source, an actuating coil for controlling closing operation of said switch, an auxiliary transformer connected to said source and provided with a secondary winding, said welding transformer when energized from said source having a secondary terminal voltage which upon open-circuiting of said welding circuit substantially equals the open circuit voltage of said auxiliary transformer secondary winding, and means comprising said coil connecting said auxiliary transformer secondary winding across said welding transformer secondary winding to cause closure of said switch in response to an increase in the current through said coil upon short-circuiting of said welding transformer secondary winding and to maintain said switch closed by the differential effect of the said voltages on said coil, said switch being biased to open in response to deenergization of said coil upon open-circuiting of said welding circuit substantially equalizing the said voltages.

2. In a control system for a welding transformer comprising a primary winding to be connected across a source of alternating current and a secondary winding connected to a welding circuit, the combination of a switch for connecting said primary winding with said source, an actuating coil for controlling closing operation of said switch, an auxiliary transformer connected to said source and provided with a secondary winding, said welding transformer when energized from said source having a secondary terminal voltage which upon open-circuiting of said welding circuit substantially equals the open circuit voltage of said auxiliary transformer secondary winding, and means comprising said coil connecting said auxiliary transformer secondary winding across said welding transformer secondary winding to cause closure of said switch in response to an increase in the current through said coil upon short-circuiting of said welding transformer secondary winding and to maintain said switch closed by the differential effect of the said voltages on said coil, said switch being biased to open in response to deenergization of said coil upon open-circuiting of said welding circuit substantially equalizing the said voltages, said means including delayed means responsive after a predetermined period to a prolonged decrease in the terminal voltage of the welding transformer secondary winding upon prolonged short-circuiting of said welding circuit for opening the circuit of said coil after the circuit of said coil has been closed by the differential effect of said voltages on said coil.

3. In a control system for a welding transformer comprising a primary winding to be connected across a source of alternating current and a secondary winding connected to a welding circuit, the combination of a switch for connecting said primary winding with said source, an actuating coil for controlling closing operation of said switch, an auxiliary transformer connected to said source and provided with a secondary winding, said welding transformer when energized from said source having a secondary terminal voltage which upon open-circuiting of said welding circuit substantially equals the open circuit voltage of said auxiliary transformer secondary winding, and means comprising said coil connecting said auxiliary transformer secondary winding across said welding transformer secondary winding to cause closure of said switch in response to an increase in the current through said coil upon short-circuiting of said welding transformer secondary winding and to maintain said switch closed by the differential effect of the said voltages on said coil, said switch being biased to open in response to deenergization of said coil upon open-circuiting of said welding circuit substantially equalizing the said voltages, said means including delayed means comprising the combination of a delay switch with instantaneous closure and time-delayed opening for connecting said coil between said auxiliary transformer secondary winding and said welding transformer secondary winding, a solenoid coil connected across said welding circuit for controlling closing operation of said delay switch, said solenoid coil being effective to close said delay switch in response to energization of said auxiliary transformer and to maintain said delay switch closed during welding operation of said welding transformer, said delay switch being biased to open in response to a prolonged decrease in the voltage of the welding circuit upon prolonged short-circuiting of said welding circuit.

4. In a control system for a welding transformer comprising a primary winding to be connected across a source of alternating current and a secondary winding connected to a welding circuit, the combination of a switch having a plurality of sets of contacts, one of said sets of contacts being operable for connecting said primary winding with said source upon closing operation of said switch, an actuating coil for controlling closing operation of said switch, an auxiliary transformer connected to said source and provided with a secondary winding, said welding transformer when energized from said source having a secondary terminal voltage which upon open-circuiting of said welding circuit substantially equals the open circuit voltage of said auxiliary transformer, means comprising said coil connecting said auxiliary transformer secondary winding across said welding transformer secondary winding to cause closure of said switch in response to an increase in the current through said coil upon short-circuiting of said welding transformer secondary winding and to maintain said switch closed by the differential effect of the said voltages on said coil, said switch being biased to open in response to deenergization of said coil upon open-circuiting of said welding circuit substantially equalizing the said voltages, and a shunt circuit comprising impedance means connected across said coil for controlling the voltage impressed on said coil, another of said sets of contacts being operable to open said shunt circuit in response to closing operation of said switch.

DIDIER JOURNEAUX.

REFERENCES CITED

The following references are of record in the file of this patent:

UNITED STATES PATENTS

| Number | Name | Date |
|---|---|---|
| 2,110,436 | Candy | Mar. 8, 1938 |
| 2,189,606 | King | Feb. 6, 1940 |
| 2,214,868 | Welch | Sept. 17, 1940 |
| 2,364,372 | Kenrick | Dec. 5, 1944 |
| 2,376,215 | Welch | May 15, 1945 |